Oct. 24, 1939.   E. W. DAVIS   2,177,057
LUBRICATING APPARATUS
Filed Jan. 22, 1937
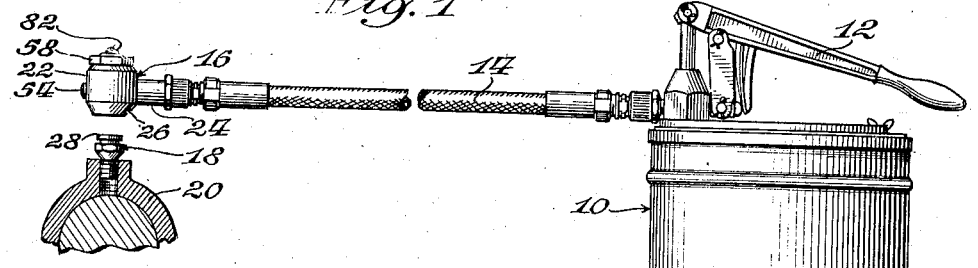
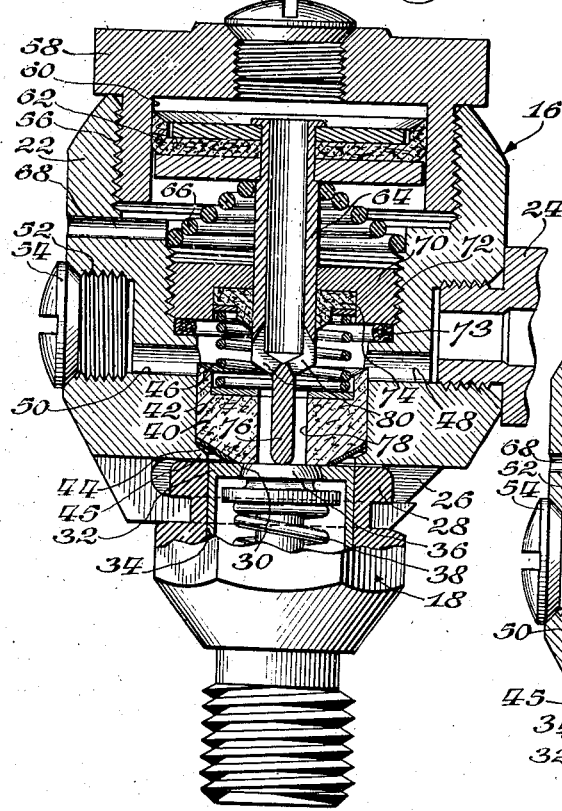
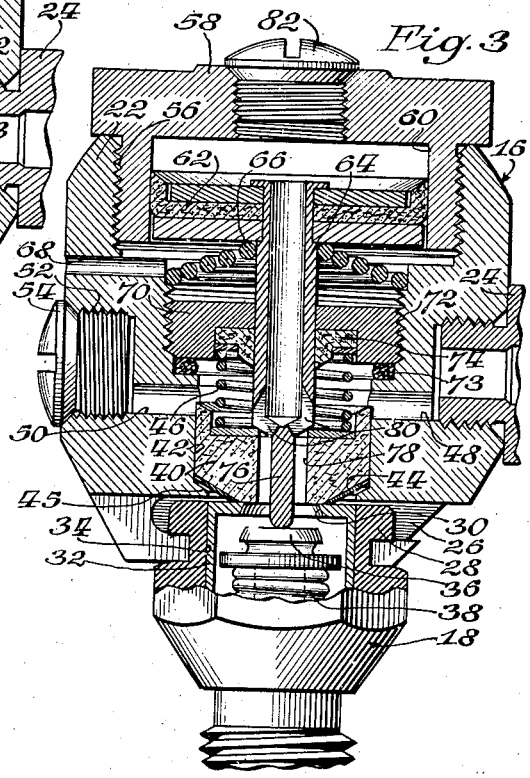
Inventor:
Ernest W. Davis
By Williams, Bradbury, McCaleb & Hinkle
Attys.

Patented Oct. 24, 1939

2,177,057

UNITED STATES PATENT OFFICE 2,177,057

LUBRICATING APPARATUS

Ernest W. Davis, Oak Park, Ill., assignor to Stewart-Warner Corporation, Chicago, Ill., a corporation of Virginia Application January 22, 1937, Serial No. 121,742

4 Claims. (Cl. 284—17)

My invention relates generally to high pressure lubricating apparatus, and more particularly to improvements in couplers for use in such systems.

It is an object of my invention to provide an improved form of coupler for high pressure lubricating systems, particularly for use with so-called "button head" or "industrial" fittings.

A further object is to provide an improved form of coupler for high pressure lubricating apparatus in which means are provided mechanically to open the check valve of the lubricant receiving fitting incidental to the application of lubricant pressure to the coupler, and thereby decrease the amount of pressure required to force lubricant into the fitting.

Other objects will appear from the following description, reference being had to the accompanying drawing, in which:

Fig. 1 is an elevation of a lubricant compressor, discharge hose, and coupler, and a sectional view of the bearing having lubricant receiving fitting attached thereto;

Fig. 2 is a central vertical sectional view of the coupler with the parts shown in normal position; and Fig. 3 is a view similar to Fig. 2 showing the parts in operating position.

In the use of the button head or industrial lubricant receiving fittings, the fittings are usually connected to bearings which do not offer appreciable back pressure, or resistance to flow of the lubricant into the bearing. However, it is desirable to provide the lubricant receiving fittings with inlet check valves held closed by relatively powerful springs, to prevent the return flow and escape of lubricant from the fittings and to prevent the admission of foreign matter to the fitting due to the accidental opening of the check valve. For example, a lubricant receiving fitting may be provided with a check valve which will open only when subjected to a lubricant pressure of four hundred pounds per square inch. In supplying lubricant to a bearing equipped with a fitting of this character, the operator of the lubricant compressor must therefore supply the lubricant to the fitting at a pressure in excess of four hundred pounds per square inch, whereas in fact the bearing itself offers but a very low resistance to the flow of a lubricant, and the major portion of the resistance to flow, and hence the back pressure, is offered by the spring pressed check valve.

In accordance with my present invention, I provide a coupler which, although utilizing lubricant pressure for its operation, is effective to multiply the action of the lubricant pressure so that lubricant may be forced past the check valve of the lubricant receiving fitting and into a low resistance bearing at approximately one-tenth the pressure ordinarily required. The work necessary to pump the lubricant into the fitting is thus greatly reduced, and the lubrication operation thereby expedited and facilitated.

In the accompanying drawing, I have illustrated a lubricant compressor 10 which is manually operated by a handle 12. The lubricant from the compressor is discharged through a flexible conduit 14, the free end of which is connected to a coupler 16. This coupler is constructed and arranged to make a detachable sealed connection with the lubricant receiving fitting 18 attached to a bearing 20 to be supplied with lubricant. As shown in Figs. 2 and 3, the coupler 16 comprises a body 22 which is connected by a suitable fitting 24 with the discharge hose 14. The body 22 is provided with a suitable slot 26 to receive the flanged head 28 of the lubricant receiving fitting 18.

The fitting 18 has an inlet opening 30, in the construction illustrated, formed in a valve seat insert 32 pressed or otherwise suitably secured in the bore 34 of the fitting. The check valve 36 is pressed against the valve seat formed at the inlet opening 30 of the fitting by a relatively strong compression coil spring 38. Inasmuch as the fitting may be used with relatively viscous lubricants, it is desirable that the spring 38 be sufficiently powerful to force the valve 36 against its seat under the most adverse conditions, and thus prevent the escape of lubricant from the fitting and prevent the admission of particles of grit and dirt.

A seal between the coupler and the face of the fitting is obtained by means of a cupped sealing member 40, which may be made of leather or a suitable grease-resistant rubber composition, and is slidable in a bore 42 formed in the body 22. A dished annular retainer 44, preferably made of hard steel, holds the lower end of the sealing member 40 in shape and prevents abrasion thereof as the coupler is attached to and detached from the fitting. The engagement of the retainer 44 with an inwardly directed flange 45 at the lower end of bore 42 limits outward (downward) movement of the sealing member. The sealing member 40 is held in contact with the end face of the fitting by a compression coil spring 46. Lubricant is supplied to the cylinder 42 above the sealing member 40 through a passageway 48 which communicates with the inlet of the coupler to which the fitting 24 is connected. An extension 50 of the passageway 48 leads to a threaded opening 52 in the body 22 which is closed by a screw plug 54. By interchanging the plug 54 and fitting 24, the coupler may be converted from the "pull-on" type, wherein the coupler may be pulled over the fitting, to the "push-on" type, wherein the connection with the fitting is made by pushing the coupler relative to the fitting.

An enlarged threaded opening 56 is formed in the top of the coupler body 22 to receive a cylinder fitting 58 which is internally bored to form a cylinder 60 for a piston 62. The piston 62 has a hollow stem 64 secured thereto and is normally held in the position shown in Fig. 2 by a conical spiral spring 66. The space beneath the piston 62 is in open communication with the atmosphere through a vent passageway 68. The piston stem 64 is guided in a member 70 threaded in a bore 72 and sealed by a gasket 73, and a seal about the stem is effected by a hat-shaped packing ring 74 which is held in position by the compression coil spring 46. The lower end of the stem 64 is provided with a projection 76 which lies within the lubricant conducting passageway 78 formed in the sealing member 40. A pair of ports 80 permit flow of lubricant from the passageway 48 and pass above the sealing member 40 into the hollow stem 64.

The cylinder fitting 58 has a central threaded opening to receive a plug 82 which may be interchanged with the hose connection fitting 24 if desired.

When the parts of the coupler are in their respective positions as shown in Fig. 2, and lubricant under pressure is supplied from the compressor 10 through the conduit 14, the lubricant will flow through the passageway 48 into the bore 42 above the sealing member 40 and thence through the openings 80 and hollow stem 64 into the cylinder 60 above the piston 62. The piston 62 will thus be forced downwardly, causing its projection 76 to depress the check valve 36 to open position, as shown in Fig. 3, thereby permitting lubricant readily to flow through the passageway 78 of the sealing member 40 into the lubricant receiving fitting and hence to the bearing to be lubricated.

Upon discontinuing the pumping operation, the spring 66 will force the piston 62 upwardly, the lubricant theretofore contained in the cylinder 60 being forced downwardly through the piston stem and into the fitting until the check valve 36 has closed against its seat. Any lubricant escaping past the packing ring 74 or piston 62 is permitted to escape to the atmosphere through the vent passageway 68. After the piston 62 has been returned to its normal position by the spring 66, the coupler may readily be disconnected from the fitting by sliding the head transversely of the axis of the fitting so as to disengage the flanged head 28 from the slot 26.

While I have shown and described a particular embodiment of my invention, it will be readily understood by those skilled in the art that variations may be made in the construction disclosed without departing from the basic features of my invention. I therefore do not wish to be limited to the precise construction disclosed, but wish to include within the scope of my invention all such modifications and variations which will readily suggest themselves.

What I claim as new and desire to secure by United States Letters Patent is:

1. A coupler for high pressure lubricating systems comprising a rigid body having a bore therein, means for connecting said bore to a source of lubricant under pressure, a sealing member reciprocable in said bore and having a passageway extending therethrough, means on said body and integral therewith for making a quick detachable connection with a lubricant receiving fitting containing an inlet check valve, a cylinder, a piston reciprocable in said cylinder and movable in a direction toward said fitting when subjected to lubricant pressure, a spring for moving said piston in the opposite direction, a valve engaging element actuated by said piston and operable upon the application of lubricant pressure to said piston to engage the check valve of said fitting over a limited area of its exposed face and move it from its seat to permit relatively free flow of lubricant from the coupler into said fitting.

2. In a high pressure lubricating system having a lubricant compressor, a lubricant receiving fitting comprising a headed body having an inlet opening, a check valve for closing said opening, and a relatively strong spring for holding said check valve in closed position, the combination of a coupler having a transverse slot for receiving the head of said fitting and connected thereto by movement transverse to the axis of the fitting, a sealing member engageable with said fitting around the inlet opening thereof to make a lubricant-tight joint between the coupler and the fitting, means moved from normal position by the pressure of the lubricant supplied to said coupler by said compressor to open said check valve when subjected to lubricant pressures substantially less than could be directly resisted by the check valve in said fitting, and a spring operable to return said means to normal position upon reduction of the lubricant pressure.

3. A coupler for high pressure lubricating apparatus comprising, a body having means for making a detachable mechanical connection with a lubricant receiving fitting, a sealing member having a passageway therethrough leading to a face engageable with a lubricant receiving fitting, a cylinder in said body, a piston reciprocable in said cylinder, a stem secured to said piston and having a part projecting through the passageway in said sealing member, means to supply lubricant to said cylinder to move said piston in a direction to project said part beyond the face of said sealing member, and a spring to move said piston and said part in the opposite direction.

4. In a high pressure lubricating system having a fitting with an inwardly opening check valve backed by a relatively strong spring to hold the valve closed, a coupler for connecting a source of lubricant under pressure to the fitting comprising, means for making a quick detachable connection between the source and the fitting, sealing means actuated by the pressure of lubricant supplied by said source for making a lubricant-tight connection, a cylinder of relatively large cross sectional area, a piston reciprocable in said cylinder and operable upon application of lubricant pressure thereto to move in one direction, a spring for moving said piston in the opposite direction, and means actuated by said piston independently of said sealing means for engaging and unseating said valve.

ERNEST W. DAVIS.